UNITED STATES PATENT OFFICE.

JOHN S. ROGERS, OF GLOUCESTER, MASSACHUSETTS.

PROCESS OF EXTRACTING GELATINE OR ICHTHYOCOLLA FROM SALTED FISH-SKINS.

SPECIFICATION forming part of Reissued Letters Patent No. 9,296, dated July 13, 1880.

Original No. 167,123, dated August 24, 1875; Reissue No. 9,226, dated June 1, 1880. Application for reissue filed June 7, 1880.

*To all whom it may concern:*

Be it known that I, JOHN S. ROGERS, of Gloucester, of the county of Essex and State of Massachusetts, have invented a new and useful Process of Extracting Gelatine or Ichthyocolla from Salted Fish-Skins; and I do hereby declare the same to be described in the following specification.

In the preparation for the market of what is termed "salt fish," whether it be cod, hake, or cusk, it is customary after the fish has been salted and dried to strip the skin from the flesh, and after removal of the bones from the latter to cut it into suitable pieces and pack them in boxes for preservation or sale. The skins so stripped from the flesh, by reason of being very strongly impregnated with salt, or chloride of sodium, have been of little or no value before the date of my invention. On account of the salt in them they could not to advantage be used for manure, and therefore were considered as so much waste matter.

My invention is to utilize such salted skins of fish, and in carrying it out the first portion of it is to desalt the skins, such portion of the process causing the removal of scales from the skins, it being accomplished by soaking the skins in cool water and agitating them therein sufficiently to extract the salt from them. The water should be changed repeatedly until the salt may have been separated from the skins, after which they are to be put into fresh water, which should be gradually heated to a boiling temperature, and kept so for three hours, more or less, until the gelatine may have been sufficiently extracted from the skins by the water so heated. Next, the superfluous matter or matters should be removed from the gelatinous solution thus procured, and it (the gelatinous solution) should be strained or filtered in order to obtain it in a purified state. Finally, the liquid is to be suitably evaporated by introducing the solution into pans or molds, or upon slabs, and exposing it to the atmosphere until it may be sufficiently condensed for use, whether as an article of food or as a glue for mechanical purposes.

I claim as my invention—

The process, substantially as described, of obtaining gelatine from salted fish-skins, it consisting in desalting and boiling them, separating from the gelatinous solution so obtained the superfluous matter or matters, and reducing it (the solution) by evaporation to the necessary consistency for use, as set forth.

JOHN S. ROGERS.

Witnesses:
R. H. EDDY,
WM. W. LUNT.